(12) United States Patent
Jetter et al.

(10) Patent No.: US 8,103,703 B1
(45) Date of Patent: Jan. 24, 2012

(54) SYSTEM AND METHOD FOR PROVIDING CONTENT-SPECIFIC TOPICS IN A MIND MAPPING SYSTEM

(75) Inventors: Michael B. Jetter, Greenbrae, CA (US); Richard Barber, Berkeley, CA (US); Michael S. Scherotter, Fairfax, CA (US); Stefan Funk, Larkspur, CA (US); Andrew Mochalskyy, San Francisco, CA (US); Peter Hizalev, San Francisco, CA (US)

(73) Assignee: Mindjet LLC, San Francisco, CA (US)

( * ) Notice: Subject to any disclaimer, the term of this patent is extended or adjusted under 35 U.S.C. 154(b) by 546 days.

(21) Appl. No.: 11/478,220

(22) Filed: Jun. 29, 2006

(51) Int. Cl.
*G06F 17/30* (2006.01)

(52) U.S. Cl. ....................................... 707/805

(58) Field of Classification Search ............... 707/1, 100, 707/102, 103 Y, 103 Z, 104.1; 715/751
See application file for complete search history.

(56) References Cited

U.S. PATENT DOCUMENTS

| | | |
|---|---|---|
| 5,257,185 A | 10/1993 | Farley et al. |
| 5,327,529 A | 7/1994 | Fults et al. |
| 5,341,223 A | 8/1994 | Shigeeda et al. |
| 5,548,749 A | 8/1996 | Kroenke et al. |
| 5,555,357 A | 9/1996 | Fernandes et al. |
| 5,597,312 A | 1/1997 | Bloom et al. |
| 5,619,694 A | 4/1997 | Shimazu |
| 5,627,979 A | 5/1997 | Chang et al. |
| 5,787,417 A | 7/1998 | Hargrove |
| 5,966,123 A | 10/1999 | Kaplan |
| 6,121,971 A | 9/2000 | Berry et al. |
| 6,148,311 A | 11/2000 | Wishnie et al. |
| 6,191,786 B1 | 2/2001 | Eyzaguirre et al. |
| 6,377,287 B1 | 4/2002 | Hao et al. |
| 6,496,208 B1 | 12/2002 | Bernhardt et al. |
| 6,738,964 B1 | 5/2004 | Zink et al. |

(Continued)

FOREIGN PATENT DOCUMENTS

EP 0784263 7/1997

(Continued)

OTHER PUBLICATIONS

Lu, Yiling, Roadmap for tool support for collaborative ontology engineering, University of Victoria, 2003, pp. 1-119.

(Continued)

*Primary Examiner* — Cam-Linh Nguyen
(74) *Attorney, Agent, or Firm* — Tina M. Lessani; Lessani & Associates, PC (57) ABSTRACT

The present invention provides a mind mapping system that supports at least two types of topics: (1) topics that primarily provide a blank space in which text and graphic elements can be inserted by the user and (2) topics that operate as components with predefined behavior for the display of a certain kind of content. The first type of topic is well-known in the art, but the second type is novel. The second type of topic enables users to easily display, view and/or manipulate certain kinds of content within a topic. Examples of the second type of topic include topics that operate as video players for the display of video data, topics that operate as spreadsheet applications for the display of spreadsheet data, topics that operate as calculators for performing mathematical functions, and topics that act as interfaces to external systems, such as email systems, CAD systems, inventory/purchase order systems, and contact-management systems.

32 Claims, 8 Drawing Sheets

U.S. PATENT DOCUMENTS

| | | | |
|---|---|---|---|
| 6,961,910 | B2 | 11/2005 | Lee et al. |
| 7,080,092 | B2 | 7/2006 | Upton |
| 7,181,438 | B1 | 2/2007 | Szabo |
| 7,313,766 | B2* | 12/2007 | Kautto Kiovula et al. .... 715/853 |
| 7,627,828 | B1 | 12/2009 | Collison et al. |
| 2002/0030703 | A1 | 3/2002 | Robertson et al. |
| 2002/0049689 | A1 | 4/2002 | Venkatram |
| 2002/0076025 | A1 | 6/2002 | Liversidge et al. |
| 2002/0186238 | A1 | 12/2002 | Sylor et al. |
| 2003/0033274 | A1 | 2/2003 | Chow et al. |
| 2003/0065650 | A1 | 4/2003 | Annand et al. |
| 2003/0083922 | A1* | 5/2003 | Reed ................................ 705/9 |
| 2003/0110253 | A1* | 6/2003 | Anuszczyk et al. .......... 709/224 |
| 2003/0137536 | A1 | 7/2003 | Hugh |
| 2003/0233631 | A1* | 12/2003 | Curry et al. ................... 717/100 |
| 2004/0030741 | A1 | 2/2004 | Wolton et al. |
| 2004/0093328 | A1 | 5/2004 | Damle |
| 2004/0193588 | A1 | 9/2004 | Tago et al. |
| 2004/0219493 | A1 | 11/2004 | Phillips |
| 2005/0132305 | A1* | 6/2005 | Guichard et al. ............. 715/855 |
| 2005/0147950 | A1* | 7/2005 | Ortiz et al. .................... 434/238 |
| 2006/0005164 | A1* | 1/2006 | Jetter et al. .................... 717/113 |
| 2006/0059135 | A1 | 3/2006 | Palmon et al. |
| 2006/0059143 | A1 | 3/2006 | Palmon et al. |
| 2006/0095474 | A1 | 5/2006 | Mitra et al. |
| 2006/0184886 | A1 | 8/2006 | Chung et al. |
| 2007/0106974 | A1 | 5/2007 | Chafe et al. |
| 2007/0239680 | A1 | 10/2007 | Oztekin et al. |
| 2007/0266040 | A1* | 11/2007 | Figlin .......................... 707/102 |
| 2008/0001948 | A1* | 1/2008 | Hirsch ......................... 345/440 |

FOREIGN PATENT DOCUMENTS

| | | |
|---|---|---|
| EP | 1615145 | 1/2006 |

OTHER PUBLICATIONS

"Mindjet MindManager 6 User's Guide" [Online] 2005, XP-002481935. Retrieved from the Internet: URL: http://www.mindjet.com/pdf-eng/MindManager_6_Help_Guide.pdf, pp. 4, 177-180.

Spanger, S., et al., "Mindmap: Utilizing Multiple Taxonomies and Visualization to Understand a Document Collection," Proceedings of the 35th Annual Hawaii International, 2001.

Sumner, T., et al., "A Web Service Interface for Creating Concept Browsing Interfaces" D-Lib Magazine, Nov. 2004 vol. 10, No. 11, Nov. 2004, XP002580529 ISSN: 1082-9873.

\* cited by examiner

SYSTEM AND METHOD FOR PROVIDING CONTENT-SPECIFIC TOPICS IN A MIND MAPPING SYSTEM

BACKGROUND OF THE INVENTION

1. Field of the Invention

This invention relates generally to mind mapping systems, and, more particularly, to generating topics in a mind map that have a predefined behavior for display of a certain kind of content.

2. Description of the Background Art

A mind map is a diagram that represents ideas and/or information around a central topic. Mind maps are increasingly used to help people generate, classify, and/or organize ideas and information and to see such ideas and information in a hierarchical, visual layout. Mind maps are made up of hierarchically-arranged "topics."

Figure 1A:
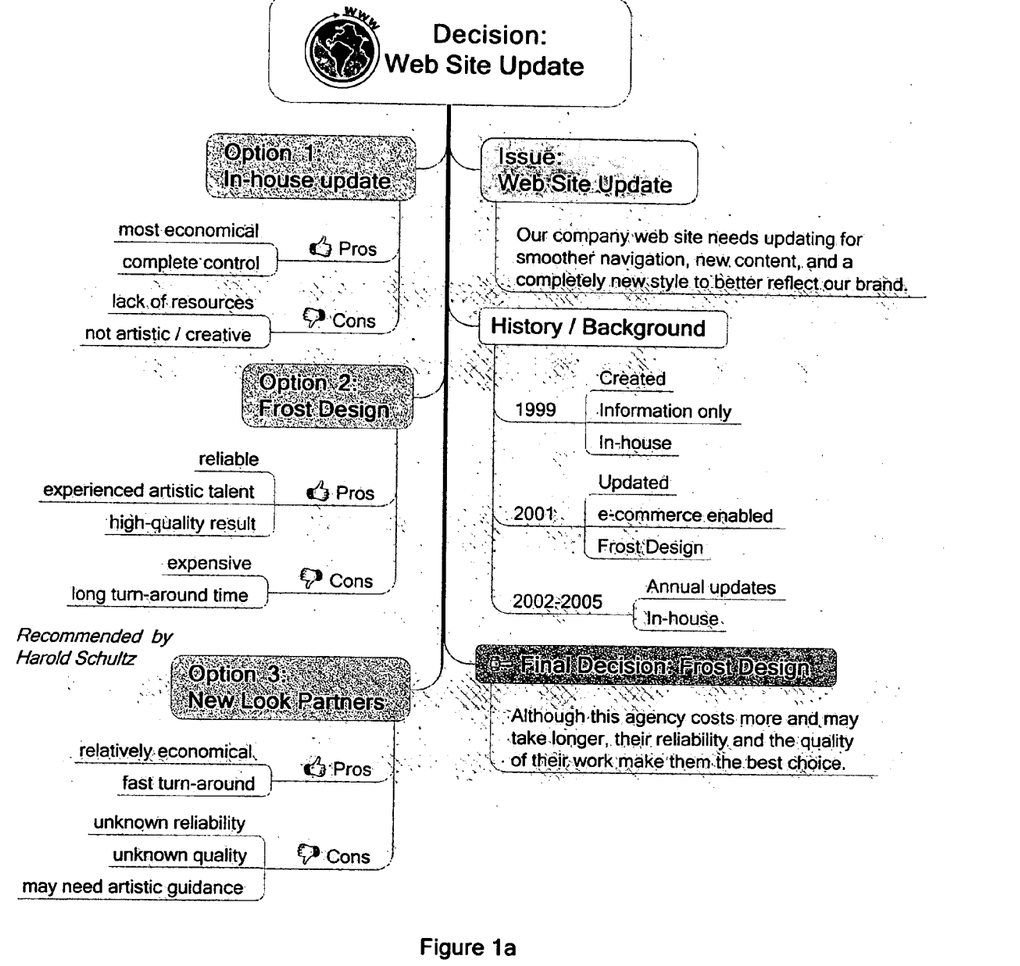
FIGS. 1a and 1b are examples of mind maps.
Figure 1B:
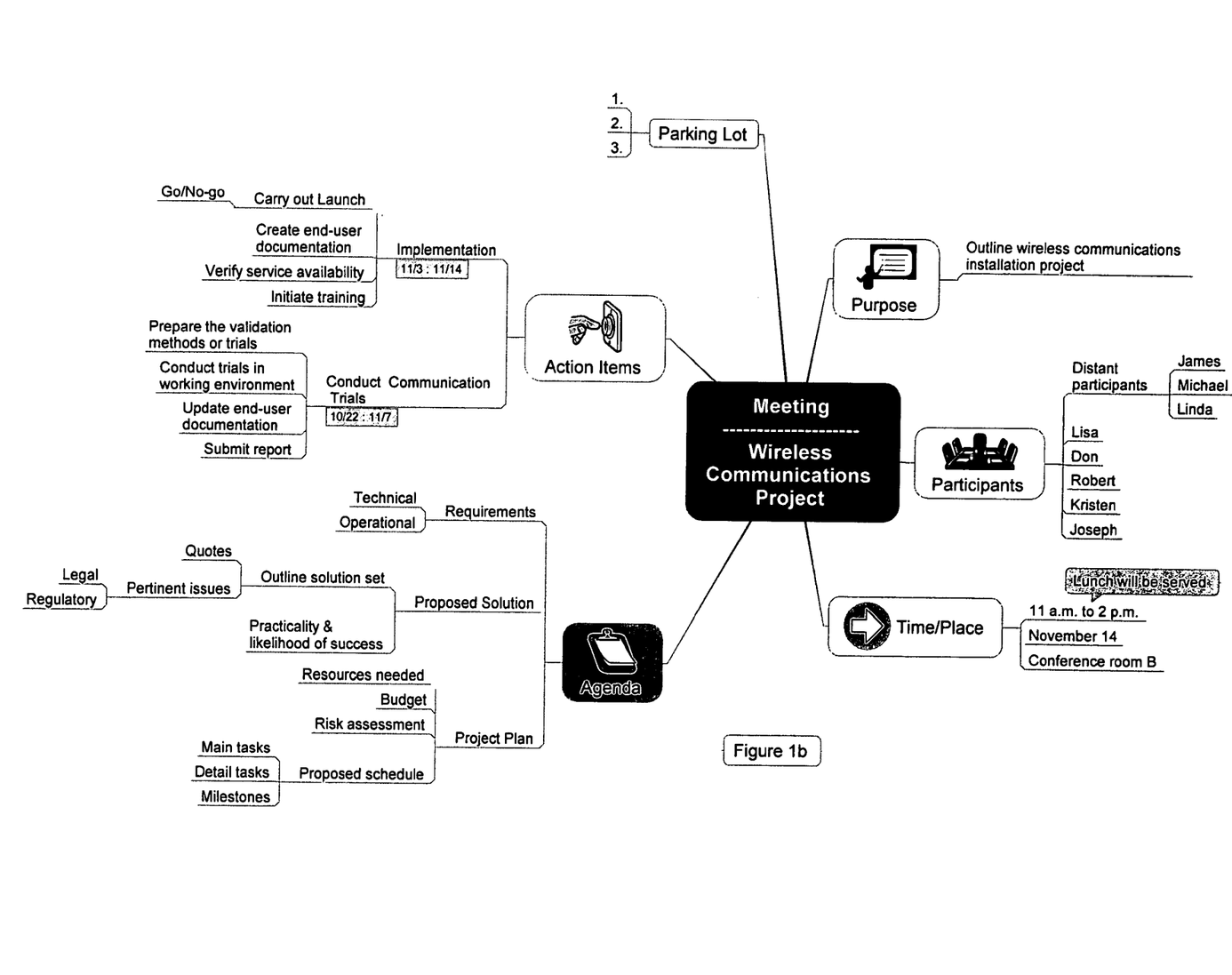

Mind maps are used for project management, work-flow analysis, organizational charts, and other purposes. FIG. 1a is an example of a mind map that organizes information and ideas related to a website update project. FIG. 1b is an example of a mind map for information related to a wireless communication project meeting. The main topics in FIG. 1b are "Action Items", "Purpose", "Agenda", "Time Place", "Participants", and "Purpose." Each of these topics has subtopics. For instance, "Implementation" is a subtopic for "Action Items," and "Carry out Launch" is a subtopic of "Implementation."

There are software programs that enable people to easily create mind maps. Mindjet, Inc.'s Mind Manager software is an example of such software. In known mind mapping software applications, users create topics in a mind map by inserting or importing texts and graphic elements into generic topics, where each topic start out as essentially the same, blank canvas (before the user enters data into it).

As users increasingly begin to use mind maps for more and more purposes, there is a desire to be able to embed rich content, such as graphics, tables, charts, videos, etc. into the mind map. Consequently, it would be desirable to have a mind mapping system that enables users to easily incorporate rich content into topics.

SUMMARY

The present invention provides a mind mapping system that supports at least two types of topics: (1) topics that primarily provide a blank space in which text and graphic elements can be inserted by the user and (2) topics that operate as components with predefined behavior for the display of a certain kind of content. The first type of topic is well-known in the art, but the second type is novel. The second type of topic, referred to herein as "content-specific topics," enables users to easily display, view and/or manipulate certain kinds of content within a topic. Examples of the second type of topic include topics that operate as video players for the display of video data, topics that operate as spreadsheet applications for the display of spreadsheet data, topics that operate as calculators for performing mathematical functions, and topics that act as interfaces to external systems, such as email systems, CAD systems, inventory/purchase order systems, and contact management systems.

DETAILED DESCRIPTION OF THE PREFERRED EMBODIMENTS

As described above, a mind map is made up of topics that are arranged hierarchically. The present invention provides a mind mapping system that supports at least two types of topics: (1) topics that primarily provide a blank space in which text and graphic elements can be inserted by the user and (2) topics that operate as components with predefined behavior for the display of a certain kind of content. The first type of topic is well-known in the art and appears in known mind mapping applications. The topics in the mind maps illustrated FIGS. 1a, 1b, 3, 4, 6, and 7 are this first type of topic.

The second type of topic is novel. The second type of topic, referred to herein as a "content-specific topic," is tailored to a specific kind of content, and it enable users to easily display, view and/or manipulate such content within the topic. There can be multiple kinds of content-specific topics for different kinds of content.

Figure 2:
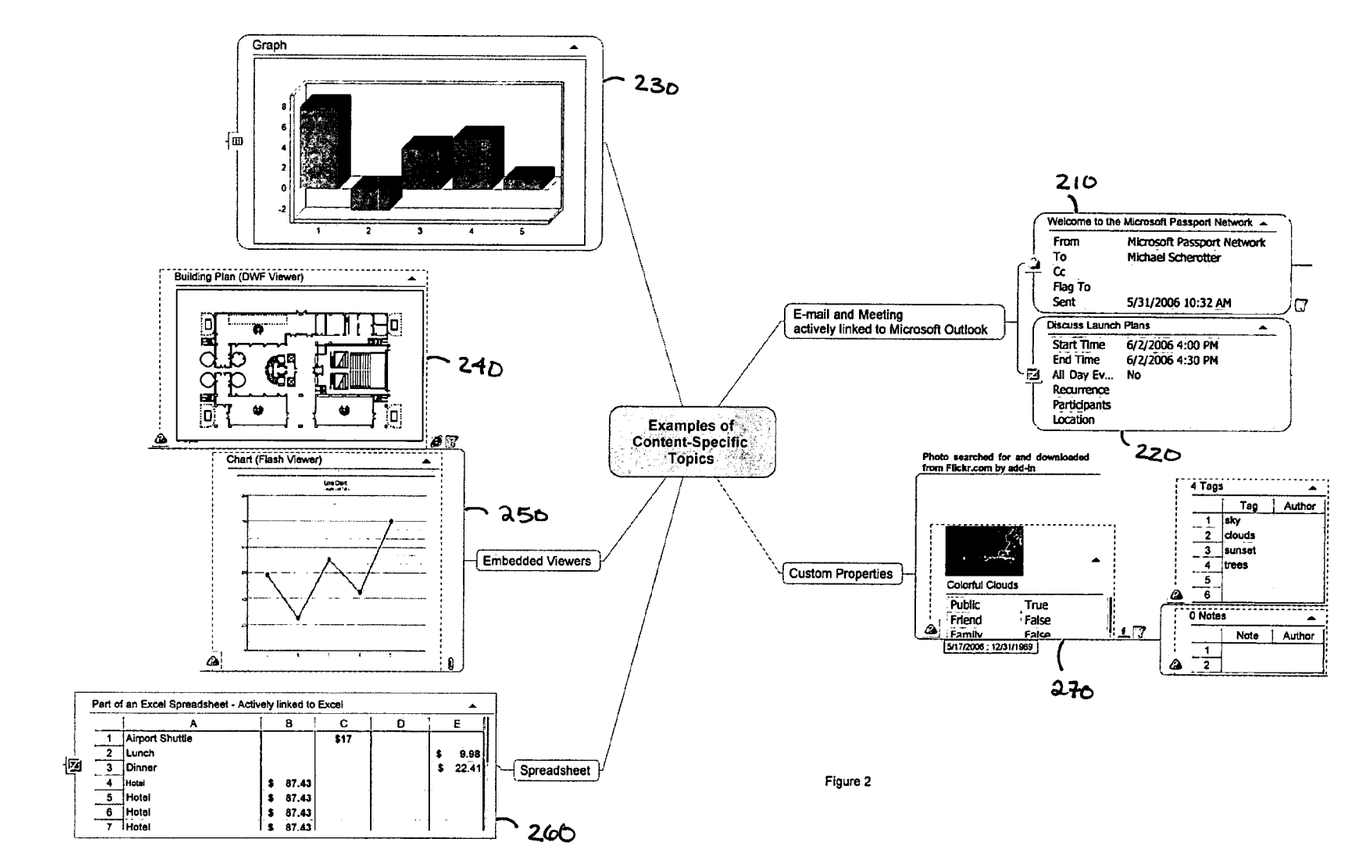
FIG. 2 is a mind map with examples of content-specific topics.

FIG. 2 illustrates examples of content-specific topics. Topics 210 and 220 operate as components that interface with Microsoft Outlook ("Outlook") and that display Outlook data. Thus, the kind of content associated with such topics is Outlook data. The predefined behavior of such topics includes interacting with an Outlook application to enable a user to create Outlook items or import information from Outlook. The predefined behavior also includes the way in which the information is displayed.

Topic 230 operates as a component that generates and displays a graph based on numerical data entered by a user. In one embodiment, the behavior associated with this topic includes converting spreadsheet data into a graph.

Topic 240 operates as an Autodesk Design Web Format (DWF) viewer for the display of two and three dimensional DWF designs (i.e., the predefined behavior associated with this topic includes operating as a DWF viewer). Thus, a user can add a "DWF viewer" topic to the map, and open up a DWF design within the viewer. Topic 250 operates as a MacroMedia Flash viewer for the display of Flash files. The user can display or play Flash files (e.g., videos) in the Flash viewer.

Topic 260 operates as a component that interfaces with Microsoft Excel and that displays and allows editing of all or parts of Excel spreadsheets. Topic 270 acts as a browser through which a user can search for and download web data. In the example illustrated, the topic is customized to search www.flickr.com.

Figure 3:
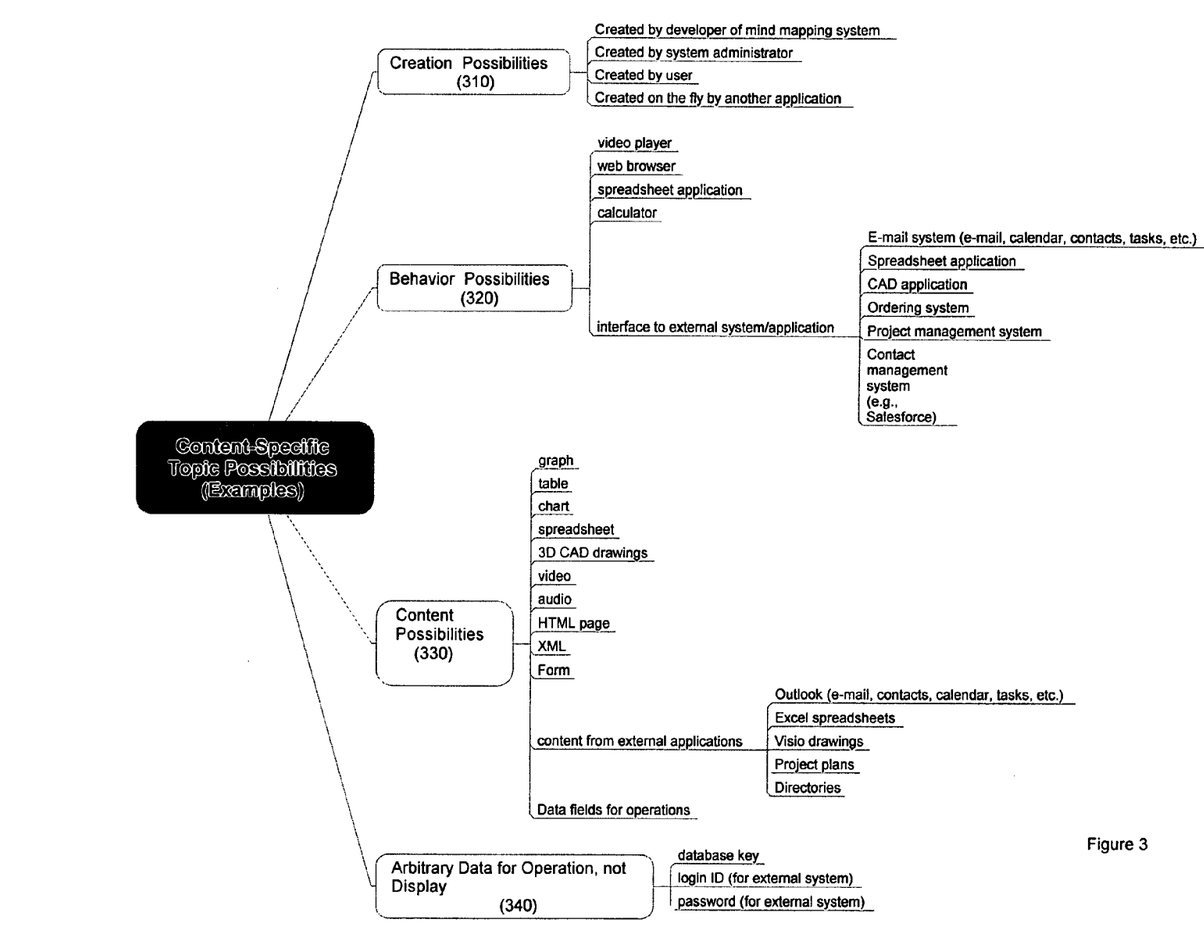
FIG. 3 is a mind map that lists examples of possible behaviors, kind of content, and other data or logic that can be associated with content-specific topics.

There are many possibilities for the kind of behavior and content that can be associated with content-specific topics. FIG. 3 lists a summary of some of the possibilities, but the invention is no way limited to these possibilities (i.e., these are just examples).

Graphs, tables, charts, spreadsheets, 3D CAD drawings, video data, audio data, HTML pages, XML data, forms, and data from third party applications (e.g., Microsoft Excel, Powerpoint, Outlook, Visio, Word, etc.) are possible kinds of content that can be displayed in a content-specific topic (330). Data not for display can also be associated with a content-specific topic. Such data is used for enabling the behavior of the topic. FIG. 3 sets forth some examples (340) of such data (e.g., database key, login ID & password for interfacing with an external application, etc.).

The behavior (320) associated with a content-specific topic defines how the topic will operate and how the content will be displayed. Possibilities for the ways in which topics can be behave include acting as a video player, web browser, spreadsheet application, calculator (e.g., a retirement calculator), and interface to an external system. Examples of the type of external systems to which content-specific topics can interface include email systems (e.g., Outlook), spreadsheet applications (e.g., Microsoft Excel), CAD and diagramming applications (e.g., Autodesk AutoCAD, Microsoft Visio,), ordering/inventory systems (e.g., through the topic users can view and approve/reject purchase orders), project management systems, and customer relationship management systems (e.g., Salesforce.com application).

Topics that interface with external systems can be configured to write data to the system, read data from the system, or both. Also, some of the above behavior possibilities can be combined into one topic. For instance, you can have a "real estate" topic that downloads and displays data from a real estate database and that includes a calculator for calculating mortgage payments (where the topic would have data fields for entering interest rate and loan amount).

As shown in topic 310 of FIG. 3, content-specific topics can be defined by the developer of the mind mapping system, by a system administrator for an entity that uses the mind mapping system, by a user, by another application, or by all three. In one embodiment, the mind mapping system includes certain "out-of-the box" content-specific topics, but the system is extensible in that user can use a software API or interactive tool to create new, custom content-specific topics by defining the content and behavior associated with the topics.

Figure 4:
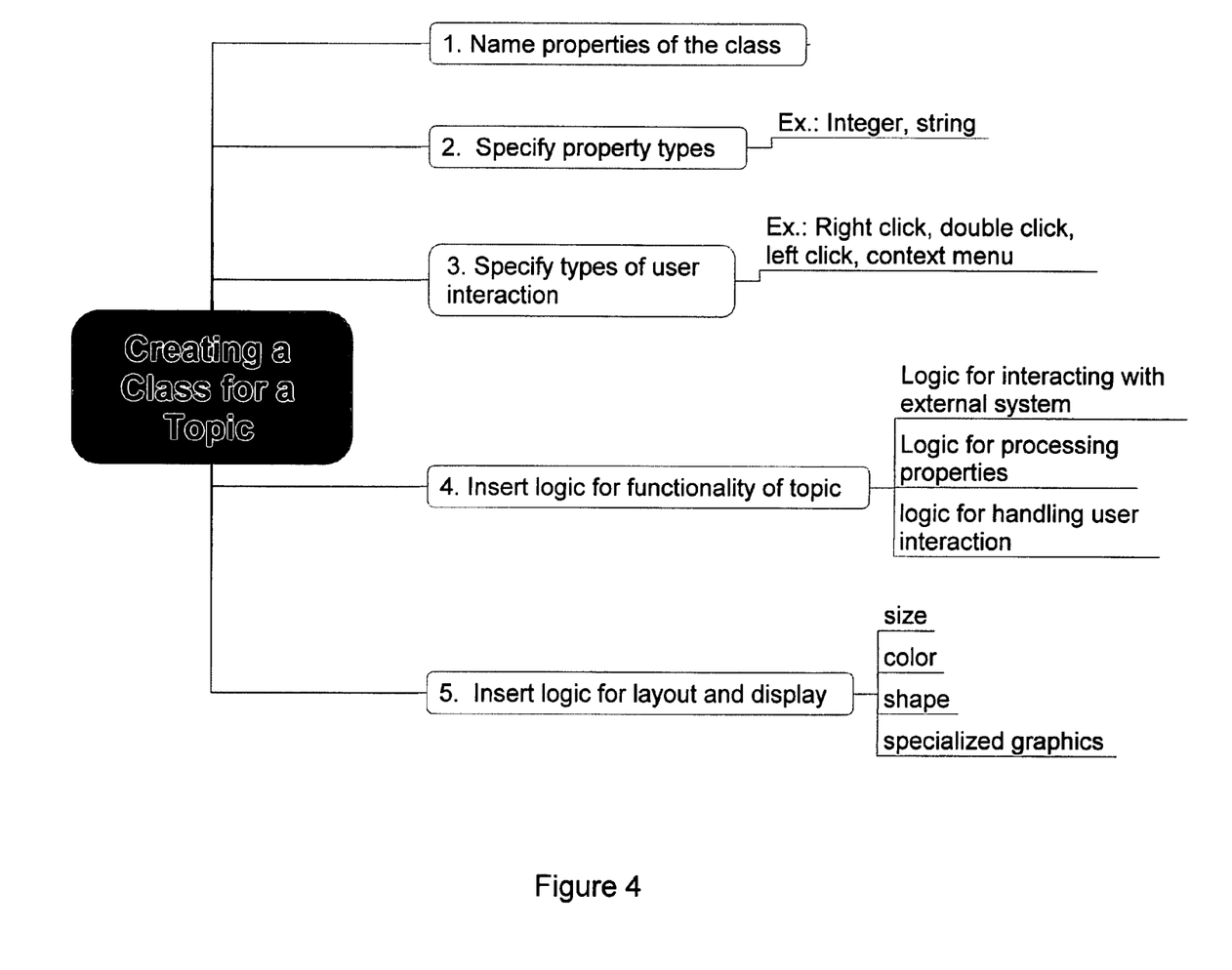
FIG. 4 is a mind map that illustrates a method for defining a class.
Figure 5:
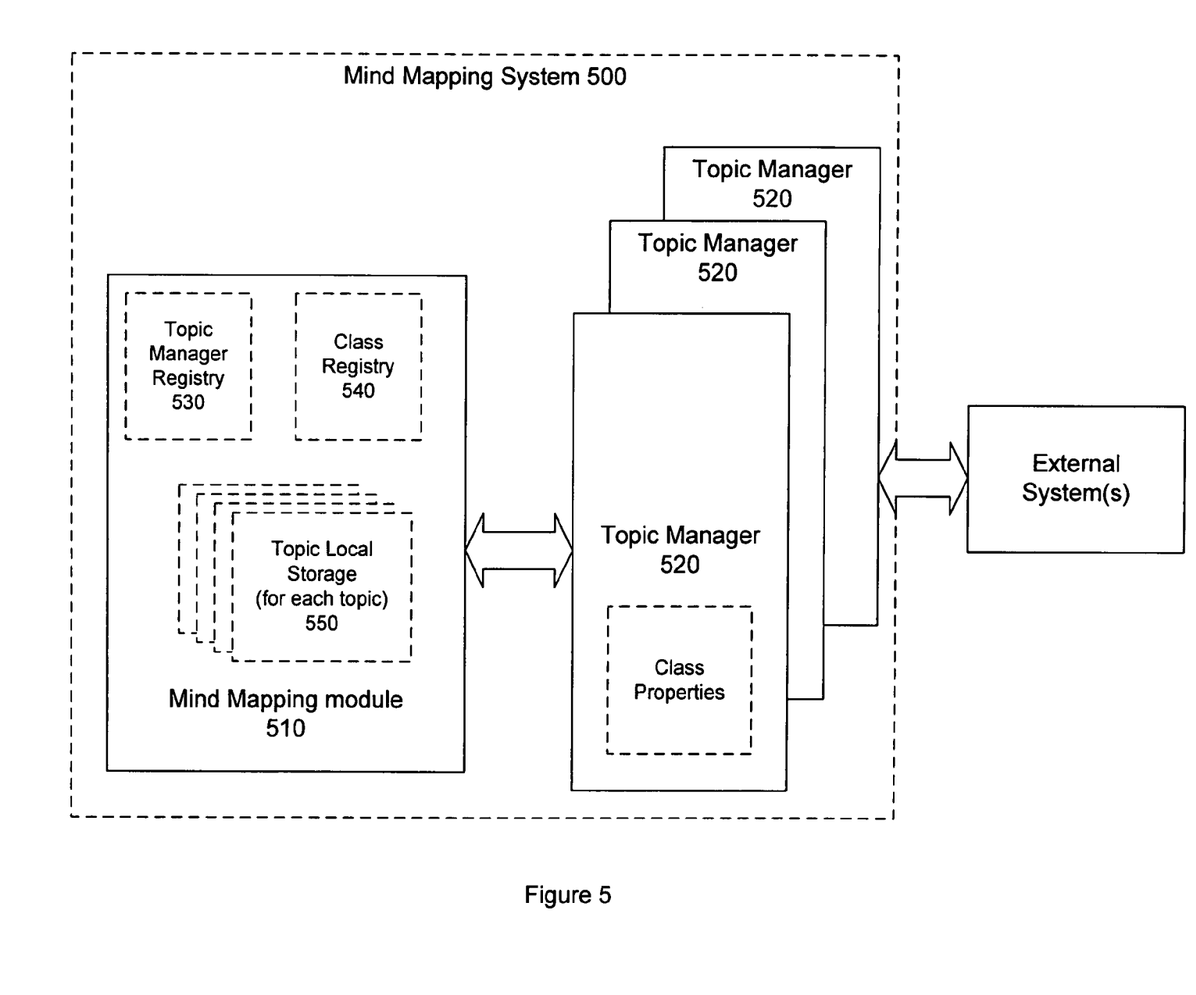
FIG. 5 is a block diagram of functional software modules in one embodiment of a mind mapping system.
Figure 6:
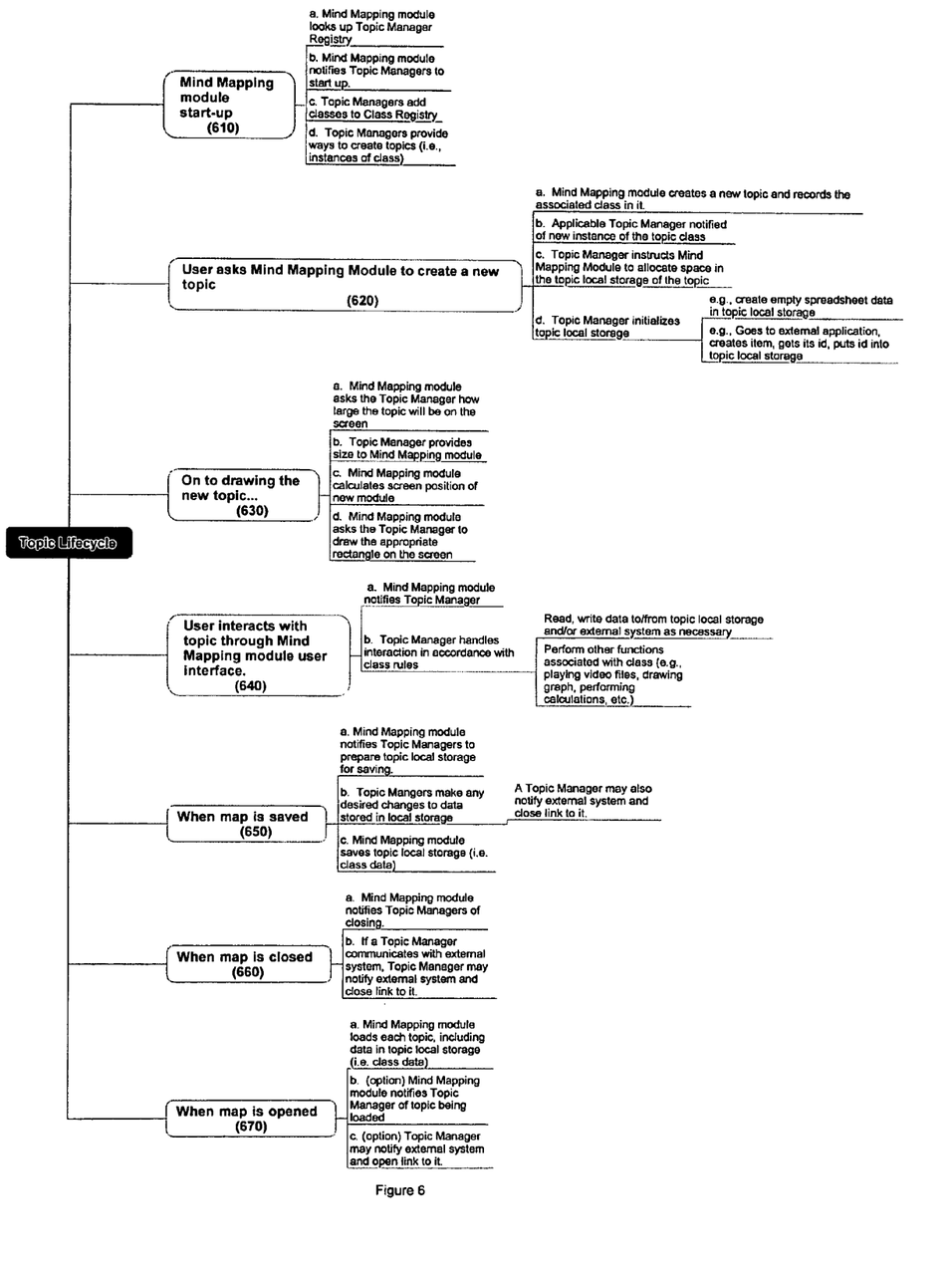
FIG. 6 is a mind map that illustrates an example of how a mind mapping system operates through a topic lifecycle.

FIGS. 4-6 illustrate one way in which to implement content-specific topics. Those skilled in the art will appreciate that the invention can be implemented in other ways, and the invention is in no way limited to the implementation described below.

In one embodiment, content-specific topics are implemented by creating a class for each kind of content-specific topic. When a user adds a certain kind of content-specific topic to the mind map, he creates an instance of the class for that content-specific topic.

FIG. 4 illustrates the key steps, according to one embodiment, for creating a class for content-specific topics. The steps do not necessarily need to be performed in the order shown.

As shown in FIG. 4, creating a class for a content-specific topic involves naming the properties of the class (step 1), specifying the property types (e.g., integer, string) (step 2), specifying the ways in which the user can interact with the topic (e.g., left-click, double-click, right-click, context menu etc.) (step 3), inserting logic for the functionality of the topic (e.g., logic for interacting with external system, logic for processing properties, logic for handling user interaction) (step 4), and inserting logic for layout and display (e.g., size of topic in mind map, color, shape, specialized graphics etc.) (step 5).

In one embodiment, the mind mapping system of the present invention is implemented by software running on a computer (where the computer can be a client computer or a server). FIG. 5 is a block diagram that illustrates the functional modules of such software that are relevant to the present invention. As shown in FIG. 5, the software includes a Mind Mapping module 510 and Topic Managers 520.

The Mind Mapping module 510 enables users to create, edit, save, retrieve, display, and manipulate mind maps. Mind mapping functionality is known in the art. The Mind Mapping module 510 maintains topic local storage 550 for each topic, where topic local storage 550 for a topic holds the data associated with the topic. The Mind Mapping Module also maintains a Topic Manager Registry 530 and a Class Registry 540. The Topic Manager Registry 530 is a registry of all Topic Managers (discussed below) in the mind mapping system. The Class Registry 540 is a registry of all the classes with which topics can be associated. When a user opens a mind map, the Mind Mapping module 510 uses the Class Registry 540 to identify the classes associated with the topics in the map.

The Topic Managers 520 manage the topics and maintain the class properties for each of the topics. Topic Managers 520 define the type of data that is stored in the topic local storage 550. There may be a separate Topic Manager for each class of topic, or if a group of classes are closely related (such as classes for Outlook email, contacts, and task), one Topic Manager may manage such classes. When a user interacts with a content-specific topic, the Topic Manager for such topic handles the interaction in accordance with the class rules for such topic. For topics that interface with an external system, the Topic Managers manage the communication between the mind mapping system and the external system.

FIG. 6 illustrates how, in one embodiment, the Mind Mapping module 510 and the Topic Manager 520 operate through a topic lifecycle (i.e., from opening to closing of the mind map) when topics are associated with a class. When the Mind Mapping module 510 starts up, it looks up the Topic Manager Registry 530 to load all the Topic Managers (step 610*a*), and it notifies the Topic Managers 520 to start up (step 610*b*) When each Topic Manager starts up, it adds all the classes it manages to the Class Registry 540 (step 610*c*). Each Topic Manager provides one or more ways for a user to create an instance of the class (i.e., a topic) (step 610*d*). For instance, a Topic Manager may instruct the Mind Mapping module 510 to add a button to the mind map user interface that enables the user to insert a certain type of topic in a map.

When a user asks the Mind Mapping module 510 to create a new topic, the Mind Mapping module 510 creates a new topic and records the associated class in it (step 620*a*). The Mind Mapping module 510 notifies the applicable Topic Manager 520 of the new instance of the topic class (step 620*b*). The Topic Manager instructs the Mind Mapping Module 510 to allocate space in the topic local storage 550 for the topic (step 620*c*), and the Topic Manager initializes that topic local storage (step 620*d*). In some embodiments, the Mind Mapping module 510 can automatically allocate the space based on the class properties listed in the class definition. The initialized topic local storage 550 will be used to store data for the topic (e.g., values of class properties). Also, if the topic interfaces with an external system, the Topic Manager 520 may communicate with the external system to obtain any necessary IDs or other data and then store the data in the topic local storage 550. For instance, for a topic that creates a new task in Outlook, the Topic Manager would communicate with Outlook to create a new task item in Outlook, retrieve the ID of the task item, and store the ID in the topic local storage 550.

With respect to drawing the topic on the screen, the Mind Mapping module 510 asks the applicable Topic Manager 520 how large the topic will be on the screen (step 630a), and such Topic Manager provides this information to the Mind Mapping module 510 (step 630b). The Mind Mapping module 510 then calculates the screen position of the new topic (step 630c) and asks the Topic Manager 520 to draw the topic in the appropriate rectangular area on the user interface (i.e., the mind map display on the computer screen) (step 630d). In some embodiments, instead of asking the Topic Manager for the size of the topic, the Mind Mapping module may automatically calculate the size and draw inside the appropriate rectangle using the class properties listed in the class definition in the Class Registry 540.

When the user interacts with the topic through the user interface, the Mind Mapping module 510 notifies the applicable Topic Manager 520 (step 640a). Such Topic Manager 520 handles the interaction in accordance with the class rules for such topic (step 640b). It reads/writes data to/from topic local storage 550 and/or an external system as necessary, and performs any other functions associated with the class. Values of class properties are stored in topic local storage 550.

When the user saves the mind map, the Mind Mapping module 510 notifies the Topic Manager 520 of each topic in the mind map to prepare its topic local storage 550 for saving (step 650a). Each of such Topic Managers 520 makes any desired changes to the topic local storage 550 (step 650b). In the embodiment illustrated in FIG. 5, the Mind Mapping module 510 controls the topic local storage 550, and, thus the Topic Mangers 520 send requests to the Mind Mapping module 510 to save and retrieve data from topic local storage 550. If a Topic Manager 520 has been in communication with an external system, the Topic Manager 520 may notify the external system that the applicable data should be saved, or it may close the link or session with the external system. After the Topic Managers have prepared the topic local storage of their topics for saving, the Mind Mapping module saves them (step 650c).

When the user closes the mind map, the Mind Mapping module 510 notifies the applicable Topic Managers 520 of the closing (step 660a). If a Topic Manager 520 has been communicating with an external system, the Topic Manager 520 may notify the external system and close the link to it (step 650b).

When the user opens up the mind map again, the Mind Mapping module 510 loads each topic in the map, including the data in each topic's topic local storage 550 (step 670a). The Mind Mapping module 510 may notify the applicable Topic Managers 520 that the map has been opened (step 670b). Each Topic Manager that communicates with an external system may then notify the applicable external system and open a link to it (step 670c).

Figure 7:
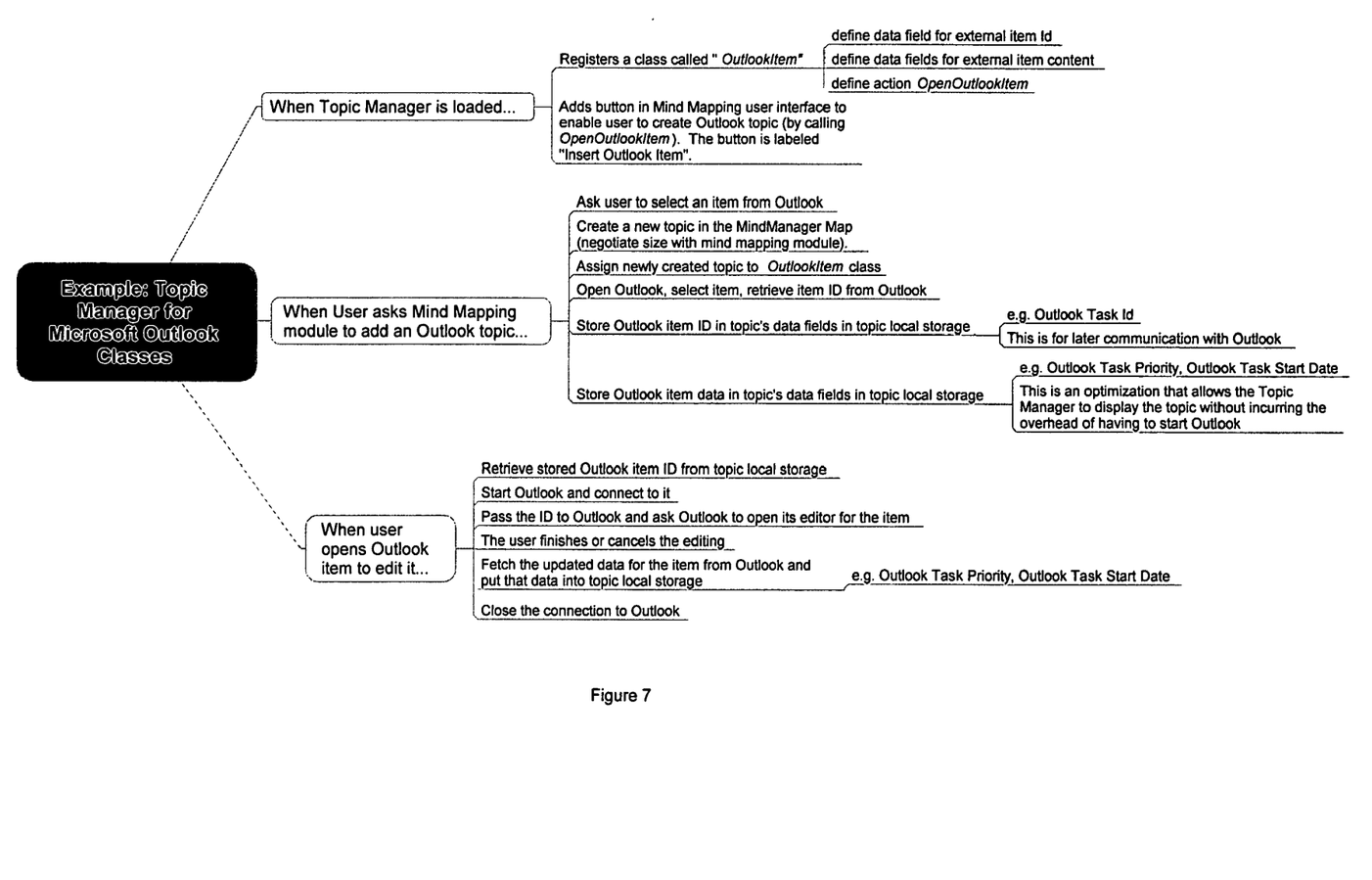
FIG. 7 is a mind map that illustrates an example of how a Topic Manager for a Microsoft Outlook class operates.

As an example, FIG. 7 illustrates the key steps performed by a Topic Manager 520 for a topic that interfaces with Outlook to create an Outlook "item" (e.g., a task, email, calendar appointment, contact). The illustrates steps occur in response to the Topic Manager 520 starting up, in response to a user asking the Mind Mapping module 510 to create an Outlook topic, and in response to a user opening the created Outlook item to edit it.

In an alternate embodiment, topics are not associated with classes. Instead, in this embodiment, the Topic Manager associated with each topic includes a set of functions to perform specific actions when called by the Mind Mapping module. Such functions could be implemented as functions, call-back functions, event handlers, or methods. In this embodiment, defining a Topic Manager for a topic involves naming the properties of the topic, specifying the property types (e.g., integer, string, etc.), specifying the ways in which the user can interact with the topic (e.g., double-click, right-click, etc.), inserting logic for the functionality of the topic (e.g., logic for interacting with external system, logic for processing properties), and inserting logic for layout and display (e.g., size of topic in mind map, color, shape, specialized graphics etc.). These are essentially the same steps as defining a class, except that, in this embodiment, there is a separate Topic Manager for each type of topic (in the class scenario, there can be one Topic Manager for similar classes (e.g., Outlook items)). The topic lifecycle in this implementation is the same as the topic lifecycle described above with respect to FIG. 4.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A computer program embodied on a computer-readable storage medium and comprising code, that, when executed by a computer, enables the computer to perform the following:
    generate, in a mind map, a first type of topic that primarily provide a blank space in which text and graphic elements can be inserted by a user; and
    generate, in a mind map, one or more of a second type of topic, wherein the second type of topic is content-specific such that it displays and processes a select type of content according to a predefined behavior and enables a user to view and manipulate the select type of content within the content-specific topic within the mind map, and wherein each kind of content-specific topic is associated with a different class that defines common behavior across instances of the class and generating a content-specific topic within the mind map comprises creating an instance of the class for the content-specific topic within the mind map.

2. The computer program of claim 1, wherein, for one of the content-specific topics, the select type of content is a graph.

3. The computer program of claim 1, wherein, for one of the content-specific topics, the select type of content is a chart.

4. The computer program of claim 1, wherein, for one of the content-specific topics, the select type of content is audio.

5. The computer program of claim 1, wherein, for one of the content-specific topics, the select type of content is video.

6. The computer program of claim 5, wherein a content-specific topic with predefined behavior for the display of video operates as a video player.

7. The computer program of claim 1, wherein, for one of the content-specific topics, the select type of content is an HTML page.

8. The computer program of claim 7, wherein a content-specific topic with predefined behavior for the display of an HTML page operates as a web browser.

9. The computer program of claim 1, wherein, for one of the content-specific topics, the select type of content is email data.

10. The computer program of claim 9, wherein a content-specific topic with predefined behavior for the display of email data operates as an interface to an email system.

11. The computer program of claim 1, wherein, for one of the content-specific topics, the select type of content is spreadsheet data.

12. The computer program of claim 11, wherein a content-specific topic with predefined behavior for the display of spreadsheet data operates as an interface to a spreadsheet application.

13. The computer program of claim 1, wherein, for one of the content-specific topics, the select type of content is graphics files.

14. The computer program of claim 13, wherein a content-specific topic with predefined behavior for the display of graphics files operates an interface to a CAD application.

15. The computer program of claim 1, wherein, for one of the content-specific, the select type of content is XML data.

16. The computer program of claim 1, wherein the select type of content is a form.

17. The computer program of claim 1, wherein the predefined behavior of at least one of the content-specific topics includes interfacing with an external system.

18. The computer program of claim 1, wherein the predefined behavior of at least one of the content-specific includes writing data to an external system.

19. The computer program of claim 1, wherein the predefined behavior of at least one of the content-specific topics includes reading data from an external system.

20. The computer program of claim 1, wherein the predefined behavior of at least one of the content-specific topics includes reading data to and writing data from an external system.

21. The computer program of claim 1, wherein the predefined behavior is defined, at least in part, by rules for how the content will be displayed.

22. The computer program of claim 1, wherein the predefined behavior of at least one of the content-specific topics includes performing a mathematical calculation.

23. The computer program of claim 1, wherein the class also defines common data fields across instances of the class.

24. The computer program of claim 23, where the class defines the arrangement of the data fields across instances of the class.

25. The computer program of claim 1, where the class is defined by a user.

26. The computer program of claim 1, where the class defines the size of the topic.

27. The computer program of claim 1, where the class defines the shape and color of the topic.

28. The computer program of claim 1, where the class defines a drawing of specialized graphics within the topic.

29. A method performed by a computer for generating a mind map, the method comprising:

generating, in a mind map, using a computer, a first type of topic that primarily provides a blank space in which text and graphic elements can be inserted by a user;

providing a user with an option to insert into the mind map one or more of a second type of topic, wherein the second type of topic is content-specific such that it displays and processes a select type of content according to a predefined behavior and enables a user to view and manipulate the select type of content within the content-specific topic within the mind map; and in response to a user opting to insert one of the content-specific topics, generating, in the mind map, such content-specific topic and performing the predefined behavior associated with such content-specific topic, wherein each kind of content-specific topic is associated with a different class that defines common behavior across instances of the class and generating a content-specific topic within the mind map comprises creating an instance of the class for the content-specific topic within the mind map.

30. The method of claim 29, wherein one of the content-specific topics creates a calendar item in an external application having calendaring functionality and enables a user to view and modify data related to the calendar item within the content-specific topic.

31. The method of 29, wherein one of the content-specific topics creates a task item in an external application having task-management functionality and enables a user to view and modify data related to the task item within the content-specific topic.

32. The method of claim 29, wherein one of the content-specific topics creates a contact item in an external application having contact-management functionality and enables a user to view and modify data related to the contact item within the content-specific topic.

* * * * *